(12) United States Patent
Hasegawa

(10) Patent No.: US 12,403,738 B2
(45) Date of Patent: Sep. 2, 2025

(54) FLUID PRESSURE SHOCK ABSORBER

(71) Applicant: KYB Corporation, Tokyo (JP)

(72) Inventor: Kazuki Hasegawa, Gifu (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 18/844,356

(22) PCT Filed: Mar. 1, 2023

(86) PCT No.: PCT/JP2023/007659
§ 371 (c)(1),
(2) Date: Sep. 5, 2024

(87) PCT Pub. No.: WO2023/171507
PCT Pub. Date: Sep. 14, 2023

(65) Prior Publication Data
US 2025/0236148 A1    Jul. 24, 2025

(30) Foreign Application Priority Data

Mar. 8, 2022    (JP) ................. 2022-035293

(51) Int. Cl.
*B60G 13/08*    (2006.01)
*B60G 17/015*    (2006.01)

(52) U.S. Cl.
CPC ......... *B60G 17/0152* (2013.01); *B60G 13/08* (2013.01); *B60G 2202/24* (2013.01); *B60G 2204/62* (2013.01); *B60G 2206/41* (2013.01); *B60G 2400/60* (2013.01);

(Continued)

(58) Field of Classification Search
CPC ................ B60G 17/0152; B60G 13/08; B60G 2202/24; B60G 2204/62; B60G 2206/41; B60G 2400/60; B60G 2500/104; B60G 2500/114; B60G 2800/162; B60G 2800/916
See application file for complete search history.

(56) References Cited

U.S. PATENT DOCUMENTS 5,311,709 A    5/1994 Kobori et al.
6,308,973 B1 *    10/2001 Griebel .............. B60G 17/0152
280/124.159

(Continued)

FOREIGN PATENT DOCUMENTS

JP    H05-171836 A    7/1993
JP    2009-250396 A    10/2009
JP    2015-206374 A    11/2015

*Primary Examiner* — Toan C To
(74) *Attorney, Agent, or Firm* — Rabin & Berdo, P.C.

(57) ABSTRACT

A fluid pressure shock absorber mounted on a vehicle includes: a cylinder tube; a rod inserted into the cylinder tube so as to be movable back and forth; a piston connected to the rod and dividing an interior of the cylinder tube into a bottom-side chamber and a rod-side chamber; a damping valve configured to impart resistance to a flow of working fluid between the bottom-side chamber and the rod-side chamber, the damping valve being capable of changing damping characteristic in response to a pilot pressure; and a solenoid valve configured to switch supply and shut off of a pilot pressure to the damping valve, wherein the working fluid in the bottom-side chamber or the rod-side chamber is used as the pilot pressure.

8 Claims, 5 Drawing Sheets

(52) U.S. Cl.
CPC .. *B60G 2500/104* (2013.01); *B60G 2500/114* (2013.01); *B60G 2800/162* (2013.01); *B60G 2800/916* (2013.01)

(56) References Cited

U.S. PATENT DOCUMENTS

| | | | |
|---|---|---|---|
| 2006/0186728 A1* | 8/2006 | Mizuta | B60G 17/0152 303/3 |
| 2010/0044976 A1* | 2/2010 | Rades | B60G 21/106 280/5.507 |
| 2014/0084555 A1* | 3/2014 | Murakami | B62K 25/00 280/5.514 |
| 2016/0236533 A1* | 8/2016 | Inagaki | F16F 9/46 |
| 2017/0016505 A1 | 1/2017 | Funato | |
| 2017/0072762 A1* | 3/2017 | Kurita | F16F 9/46 |
| 2018/0015802 A1* | 1/2018 | Jeong | B60G 17/019 |
| 2018/0229574 A1* | 8/2018 | Okimura | B60G 15/14 |
| 2021/0310535 A1* | 10/2021 | Conti | F16F 9/185 |
| 2022/0136580 A1* | 5/2022 | Shimauchi | F16F 9/065 188/322.5 |
| 2022/0242186 A1* | 8/2022 | Tong | F16F 9/516 |
| 2024/0167532 A1* | 5/2024 | Hasegawa | F16F 9/19 |
| 2024/0227488 A1* | 7/2024 | Mochizuki | B60G 17/0565 |

* cited by examiner

FLUID PRESSURE SHOCK ABSORBER

TECHNICAL FIELD

The present invention relates to a fluid pressure shock absorber.

BACKGROUND ART

With the fluid pressure shock absorber described in JP2015-206374A, a piston rod has a rod portion that extends outside a cylinder and a piston that is connected to an end portion of the rod portion and slidably moves within the cylinder to divide an interior of the cylinder into a bottom-side chamber and a rod-side chamber. The rod portion has: a rod inner space that is formed in the rod portion and communicates with the bottom-side chamber of the cylinder; a first communicating passage that connects the rod inner space and the rod-side chamber of the cylinder; and an orifice plug that is provided in the first communicating passage and generates a damping force.

SUMMARY OF INVENTION

In the fluid pressure shock absorber described in JP2015-206374A, when a damping valve capable of changing damping characteristics is to be mounted, it may be conceivable to employ a solenoid valve as the damping valve. However, if the working fluid to be passed through the damping valve has a high pressure and a large flow rate, the size of the damping valve is increased, and a mountability of the damping valve is deteriorated.

An object of the present invention is to improve a mountability of a damping valve that is capable of changing damping characteristics.

According to one aspect of the present invention, a fluid pressure shock absorber mounted on a vehicle includes: a cylinder tube; a rod inserted into the cylinder tube so as to be movable back and forth; a piston connected to the rod and dividing an interior of the cylinder tube into a bottom-side chamber and a rod-side chamber; a damping valve configured to impart resistance to a flow of working fluid between the bottom-side chamber and the rod-side chamber, the damping valve being capable of changing damping characteristic in response to a pilot pressure; and a solenoid valve configured to switch supply and shut off of a pilot pressure to the damping valve, wherein the working fluid in the bottom-side chamber or the rod-side chamber is used as the pilot pressure.

DESCRIPTION OF EMBODIMENTS

In the following, with reference to the drawings, a fluid pressure shock absorber according to an embodiment of the present invention will be described.

In the following, a case in which the fluid pressure shock absorber is a hydraulic shock absorber 100 that is mounted on a vehicle. The hydraulic shock absorber 100 is a device that suppresses vibration of a vehicle body by, for example, being interposed between the vehicle body and an axle shaft of the vehicle and by generating a damping force.

Figure 1:
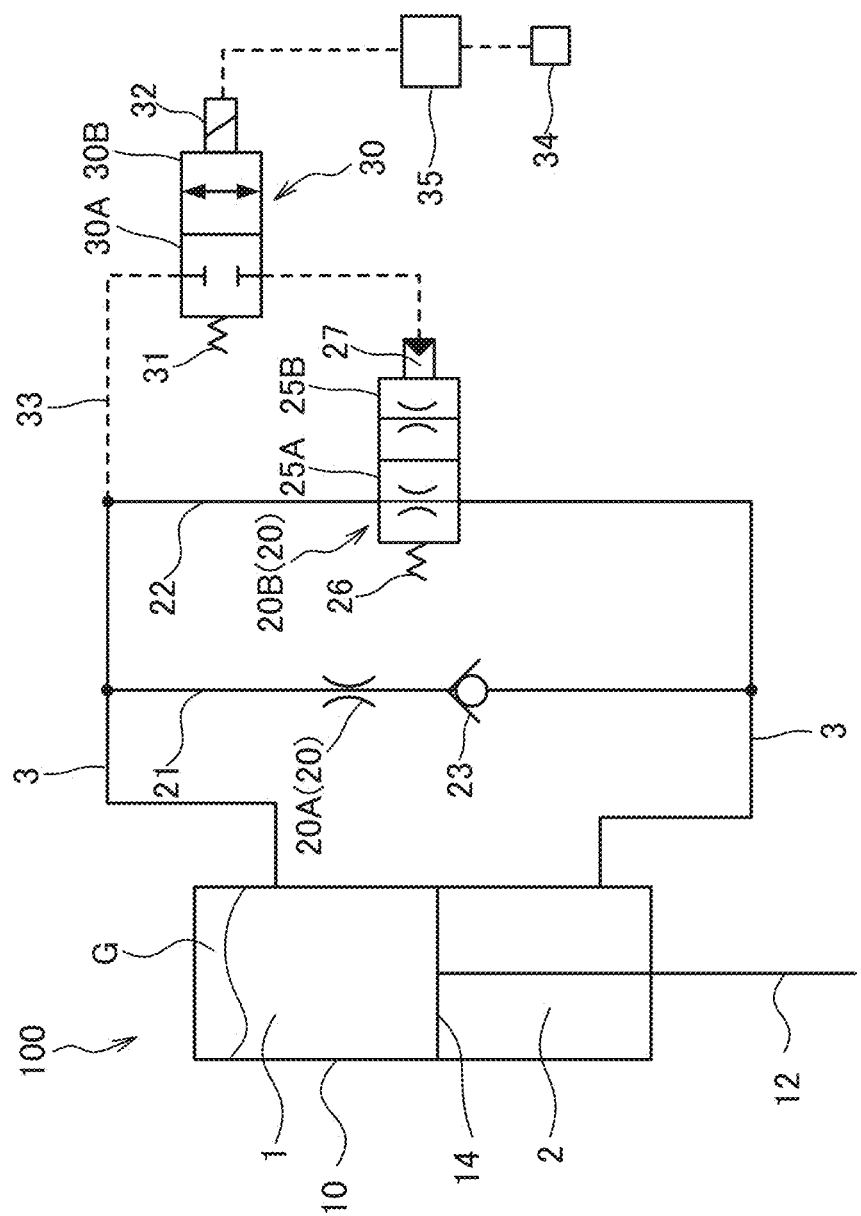
FIG. 1 is a fluid pressure circuit diagram of a fluid pressure shock absorber according to an embodiment of the present invention.

As shown in FIG. 1, the hydraulic shock absorber 100 includes a tubular cylinder tube 10, a rod 12 that is inserted into the cylinder tube 10 so as to be movable back and forth and that extends outside the cylinder tube 10, and a piston 14 that is connected to a tip end of the rod 12 and that is slidably moved along an inner circumferential surface of the cylinder tube 10. The hydraulic shock absorber 100 is installed on the vehicle in an orientation at which the cylinder tube 10 is positioned at the upper side and the rod 12 is positioned at the lower side.

An interior of the cylinder tube 10 is divided by the piston 14 into a bottom-side chamber 1 and a rod-side chamber 2. The bottom-side chamber 1 and the rod-side chamber 2 are respectively filled with working oil serving as working fluid. In the bottom-side chamber 1, pressurized gas G for exhibiting a spring effect by compensating for a volume change in the cylinder tube 10 due to inward and outward movement of the rod 12 relative to the cylinder tube 10 is sealed together with the working oil. As described above, the hydraulic shock absorber 100 has a function of an air-suspension that is capable of supporting the vehicle body by the spring effect exerted by the gas G. In this case, even if a spring for supporting the vehicle body is not provided separately, it is possible to achieve generation of the damping force and support of the vehicle body by the hydraulic shock absorber 100.

Note that, the configuration is not limited to those described above, and the gas may not be sealed in the cylinder tube 10. In addition, it may be possible to provide a free piston that is movably provided inside the bottom-side chamber 1 and that divides the bottom-side chamber 1 into a liquid chamber, into which the working oil is sealed, and a gas chamber, into which the gas G is sealed. In addition, an accumulator connected to the bottom-side chamber 1 may be provided outside the cylinder tube 10, and the gas chamber may be provided in the accumulator.

The bottom-side chamber 1 is connected to the rod-side chamber 2 through via a flow path 3. The hydraulic shock absorber 100 includes a damping valve 20 that is provided in the flow path 3 and that generates the damping force by imparting resistance to a flow of the working oil between the rod-side chamber 2 and the bottom-side chamber 1.

The flow path 3 is formed by being branched at an intermediate position, and has a first flow path 21 and a second flow path 22 that are parallel with each other. The damping valve 20 has a first damping valve 20A that is provided in the first flow path 21 and that imparts resistance to the flow of the working oil, and a second damping valve 20B that is provided in the second flow path 22 and that imparts resistance to the flow of the working oil. The first damping valve 20A and the second damping valve 20B are provided in parallel with each other.

The first flow path 21 includes a check valve 23 that only allows the flow of the working oil from the bottom-side chamber 1 to the rod-side chamber 2. Therefore, the first damping valve 20A imparts the resistance only to the flow of the working oil from the bottom-side chamber 1 towards the rod-side chamber 2. In this embodiment, the first damping valve 20A is, for example, a fixed orifice.

The second damping valve 20B imparts the resistance to the flow of the working oil between the bottom-side chamber 1 and the rod-side chamber 2 in both directions. The position of the second damping valve 20B is switched in response to a pilot pressure, and the resistances imparted to the flows of the working oil passing through at respective positions are different. In other words, the damping characteristic of the second damping valve 20B can be changed in response to the pilot pressure.

In this embodiment, the second damping valve 20B has two positions, i.e., a first restricting position 25A, at which a predetermined resistance is imparted to the flow of the working oil passing therethrough, and a second restricting position 25B, at which the resistance of a different magnitude is imparted compared to the resistance imparted at the first restricting position 25A. In other words, the first restricting position 25A and the second restricting position 25B have different pressure loss characteristics for the flow of the working oil passing therethrough.

The second damping valve 20B has a valve body (not shown) that switches the position, a spring 26 serving as a biasing member that biases the valve body, and a pilot chamber 27 to which the pilot pressure is supplied. In the second damping valve 20B, the valve body is biased by the spring 26 so as to be positioned at the first restricting position 25A. In the second damping valve 20B, as the pilot pressure is guided to the pilot chamber 27, the valve body is moved against the biasing force exerted by the spring 26, and thereby, the second damping valve 20B is switched to the second restricting position 25B. When the supply of the pilot pressure is shut off, the second damping valve 20B is switched to the first restricting position 25A by the biasing force exerted by the spring 26.

When the hydraulic shock absorber 100 is contracted, the pressure in the bottom-side chamber 1 is increased, and a part of the working oil in the bottom-side chamber 1 opens the check valve 23, passes through the first damping valve 20A and is guided to the rod-side chamber 2, while the rest of the working oil passes through the second damping valve 20B and is guided to the rod-side chamber 2. As described above, when the hydraulic shock absorber 100 is contracted, the working oil in the bottom-side chamber 1 is guided to the rod-side chamber 2 by passing through both of the first damping valve 20A and the second damping valve 20B. Therefore, when the hydraulic shock absorber 100 is contracted, the hydraulic shock absorber 100 generates the damping force corresponding to the overall flow path resistance exerted by the first damping valve 20A and the second damping valve 20B.

When the hydraulic shock absorber 100 is extended, the pressure in the rod-side chamber 2 is increased, and the working oil in the rod-side chamber 2 passes through the second damping valve 20B and is guided to the bottom-side chamber 1. On the other hand, because the check valve 23 is closed by the increase in the pressure in the rod-side chamber 2, the working oil in the rod-side chamber 2 is not guided to the bottom-side chamber 1 through the first damping valve 20A. Thus, when the hydraulic shock absorber 100 is extended, the hydraulic shock absorber 100 generates the damping force corresponding to the flow path resistance exerted by the second damping valve 20B. Therefore, when the hydraulic shock absorber 100 is contracted, because the flow of the working oil from the bottom-side chamber 1 to the rod-side chamber 2 through the first damping valve 20A is allowed, the hydraulic shock absorber 100 generates a larger damping force during the extension than during the contraction correspondingly. As a result, in a case in which the vehicle drives over a bump on a road surface, the hydraulic shock absorber 100 is contracted in a relatively smoothly, and thereafter, the hydraulic shock absorber 100 generates the larger damping force during extension, thereby effectively damping the vibration exerted from the road surface to the vehicle body.

Note that, the first flow path 21, the first damping valve 20A, and the check valve 23 are not essential configurations, and a configuration in which the damping force is generated only by the second damping valve 20B may also be employed.

The hydraulic shock absorber 100 includes a solenoid valve 30 that switches between the supply and shut off of the pilot pressure to the second damping valve 20B. The solenoid valve 30 is provided in a pilot passage 33. The pilot passage 33 is provided by being branched from the flow path 3 and connects the bottom-side chamber 1 and the pilot chamber 27 of the second damping valve 20B. The pilot passage 33 need only be configured to guide the working oil in the bottom-side chamber 1 to the pilot chamber 27 of the second damping valve 20B as the pilot pressure, and may, for example, be directly connected to the bottom-side chamber 1.

The solenoid valve 30 has two positions, i.e., a shut-off position 30A, at which the supply of the pilot pressure is shut off, and a supply position 30B, at which the pilot pressure is supplied.

Operation of the solenoid valve 30 is controlled by an electric signal input from a controller 35. The solenoid valve 30 has the valve body (not shown) that switches the position, a spring 31 serving as a biasing member that biases the valve body, and a solenoid 32 that moves the valve body against the biasing force exerted by the spring 31 by being energized.

In the solenoid valve 30, the valve body is biased by the spring 31 such that the solenoid valve 30 is positioned at the shut-off position 30A. When the solenoid 32 is exited by being energized, the valve body is moved against the biasing force exerted by the spring 31, and the solenoid valve 30 is switched to the supply position 30B. When the energization of the solenoid 32 is cutoff, the solenoid valve 30 is switched to the shut-off position 30A by the biasing force exerted by the spring 31.

The vehicle includes a detector 34 that detects the weight of the load (a load weight) loaded on a loading platform, and a detection signal from the detector 34 is output to the controller 35. When the load weight is less than a predetermined weight, the energization of the solenoid 32 of the solenoid valve 30 is cutoff by the controller 35 on the basis of the signal from the detector 34. In addition, when the load weight is equal to or greater than a predetermined weight, the solenoid 32 of the solenoid valve 30 is energized by the controller 35 on the basis of the signal from the detector 34. As described above, when the load weight of the vehicle is small, the solenoid valve 30 is positioned at the shut-off position 30A, the supply of the pilot pressure to the second damping valve 20B is shut off, and the second damping valve 20B is positioned at the first restricting position 25A. In addition, when the load weight of the vehicle is large, the solenoid valve 30 is positioned at the supply position 30B, the pilot pressure is supplied to the second damping valve 20B, and the second damping valve 20B is positioned at the second restricting position 25B.

Here, with the vehicle such as the damp truck having a large maximum load capacity, because the overall weight of the vehicle, including the load, varies significantly between an empty state with no load and a state with the load, the energy to be damped by the hydraulic shock absorber 100 also varies significantly. However, in this embodiment, the damping characteristic of the second damping valve 20B is changed by the solenoid valve 30 according to the load weight of the vehicle, and thus, the hydraulic shock absorber 100 can exhibit an optimal damping characteristic according to the load weight of the vehicle.

In this embodiment, the working oil in the bottom-side chamber 1 is used as the pilot pressure for switching the position of the second damping valve 20B. Instead, the working oil in the rod-side chamber 2 may also be used as the pilot pressure. However, while the vehicle is travelling, when the wheel lands on a bottom of a depression in the road surface or when the wheel rides over the bump on the road surface, the hydraulic shock absorber 100 is contracted suddenly and temporarily, and thus, the pressure in the rod-side chamber 2 may become negative pressure. In contrast, the bottom-side chamber 1 supports the weight of the vehicle body, and the pressurized gas G is sealed in the bottom-side chamber 1, and thus, the pressure in the bottom-side chamber 1 does not become negative pressure during the operation of the hydraulic shock absorber 100. Therefore, it is preferable to use the working oil in the bottom-side chamber 1 as the pilot pressure.

As described above, this embodiment employs a configuration in which the supply and shut off of the pilot pressure for the pilot-driven-type second damping valve 20B, which is capable of changing the damping characteristic, is switched by the solenoid valve 30. Here, in a large-sized vehicle such as a damp truck, because the hydraulic shock absorber 100 to be mounted has a large size, the flow rate of the working oil passing through the second damping valve 20B is large. In addition, in the vehicle such as the damp truck having the large maximum load capacity, because the overall weight of the vehicle is large, the pressure of the working oil in the hydraulic shock absorber 100 supporting the weight thereof is high. Furthermore, in the hydraulic shock absorber 100, because the gas G is sealed in the cylinder tube 10 and the hydraulic shock absorber 100 also has the function of the air-suspension, the pressure of the working oil in the cylinder tube 10 becomes high. As described above, in a case in which the hydraulic shock absorber 100 is mounted on the large-sized vehicle, such as the damp truck, the second damping valve 20B needs to be a valve capable of switching the flow of the working oil having a high pressure and a large flow rate. In a case in which a solenoid valve is employed as the second damping valve 20B itself, a large solenoid thrust is required to switch the position of the second damping valve 20B, and so, a size of a solenoid to be mounted on the second damping valve 20B is increased. Therefore, a mountability of the second damping valve 20B on the hydraulic shock absorber 100 is deteriorated.

In contrast, in this embodiment, because the second damping valve 20B is of a pilot-driven type, the size thereof is not increased. In addition, the supply and shut off of the pilot pressure to the second damping valve 20B is switched by the solenoid valve 30, the solenoid valve 30 is provided on the pilot passage 33, and the flow rate of a pilot fluid flowing through the pilot passage 33 is small. In this way, it suffices that the solenoid valve 30 is a valve that is capable of switching the flow of the working oil having a high pressure and a small flow rate, and a large solenoid thrust is not required, and thus, the size of the solenoid valve 30 can be reduced. Therefore, the mountability of the second damping valve 20B on the hydraulic shock absorber 100 is improved, and consequently, it is possible to make the hydraulic shock absorber 100 smaller.

Figure 2:
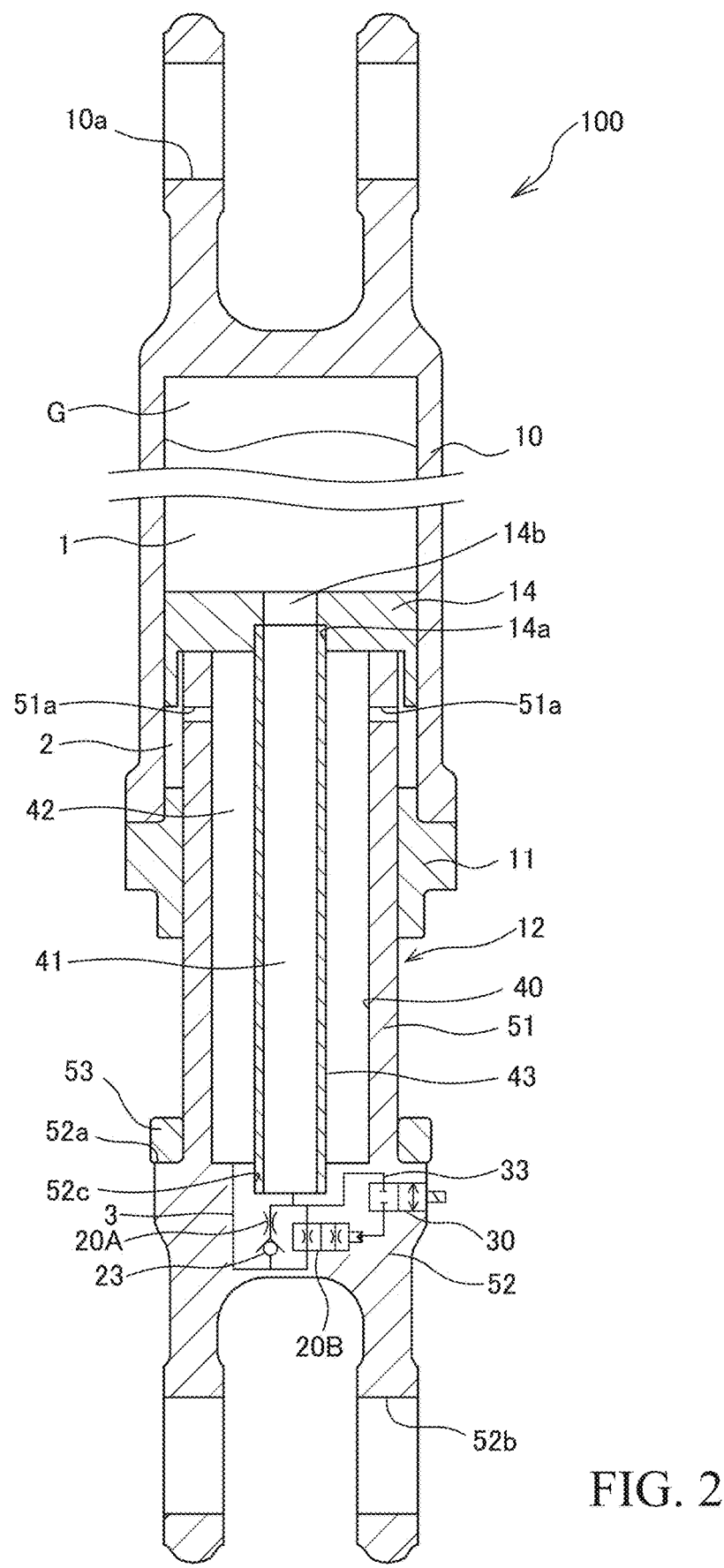
FIG. 2 is a sectional view of the fluid pressure shock absorber according to the embodiment of the present invention.

Next, with reference to FIG. 2, the structure of the hydraulic shock absorber 100, and an example of mounting the damping valve 20 and the solenoid valve 30 on the hydraulic shock absorber 100 will be described. FIG. 2 is a sectional view of the hydraulic shock absorber 100.

The cylinder tube 10 has a bottomed cylindrical shape, and a cylinder head 11, through which the rod 12 is slidably inserted, is provided on its opening end. An attachment portion 10a for attaching the hydraulic shock absorber 100 to the vehicle is provided on a closing end of the cylinder tube 10 (the end portion on the opposite side from the cylinder head 11).

The rod 12 has a rod main body 51 that is connected to the piston 14 and that is slidably supported by the cylinder head 11 of the cylinder tube 10 and a head portion 52 that is exposed to the outside of the cylinder tube 10.

The rod main body 51 is formed with a rod inner space 40 that opens at an end surface on the piston 14 side. An end portion of the rod main body 51 is joined to the piston 14 by a bolt (not shown).

The head portion 52 is formed to have a diameter larger than that of the rod main body 51, and the head portion 52 is always exposed to the outside of the cylinder tube 10 regardless of the stroke position of the hydraulic shock absorber 100. In other words, the head portion 52 is a portion of the rod 12 that does not slide with respect to the cylinder head 11. The head portion 52 is, for example, formed separately from the rod main body 51, and is connected to the end portion of the rod main body 51 by welding, etc. The rod main body 51 and the head portion 52 may be formed integrally.

The head portion 52 includes a stopper portion 52a that defines the stroke end when the hydraulic shock absorber 100 is contracted and an attachment portion 52b for attaching the hydraulic shock absorber 100 to the vehicle. The stopper portion 52a includes an annular cushion ring 53 that prevents collision between the cylinder head 11 and the rod 12 at the stroke end when the hydraulic shock absorber 100 is contracted.

The rod inner space 40 includes a cylindrical pipe 43. The one end of the pipe 43 is inserted into an insertion hole 52c formed in the head portion 52 and the other end thereof is inserted into an insertion hole 14a formed in the piston 14. As described above, the pipe 43 is provided so as to be interposed between the head portion 52 and the piston 14.

By providing the pipe 43 in the rod inner space 40, the rod inner space 40 is divided into a first space 41 that is a hollow portion in the pipe 43 and an annular second space 42 that is partitioned between an outer circumferential surface of the pipe 43 and an inner circumferential surface of the rod main body 51. The first space 41 communicates with the bottom-side chamber 1 through a through hole 14b that is formed in the piston 14. The second space 42 communicates with the rod-side chamber 2 through a plurality of through holes 51a that are formed in the rod main body 51 of the rod 12. As described above, the rod inner space 40 has the first space 41 that communicates with the bottom-side chamber 1 and the second space 42 that communicates with the rod-side chamber 2. The first space 41 and the second space 42 each forms a part of the flow path 3 that connects the bottom-side chamber 1 with the rod-side chamber 2.

The flow path 3, the first damping valve 20A, the second damping valve 20B, and the solenoid valve 30 are provided in the head portion 52 of the rod 12. The pilot passage 33 that guides the pilot pressure for driving the second damping valve 20B is also provided in the head portion 52. The pilot pressure is guided from the bottom-side chamber 1 to the second damping valve 20B through the first space 41 and the pilot passage 33. As described above, in this configuration, the pilot pressure is guided through the first space 41 and the pilot passage 33 provided in the head portion 52, and the pilot pressure is guided out from the vertically lower side with respect to the gas G that is stored on the vertically upper side of the hydraulic shock absorber 100. Therefore, because the gas G is prevented from being mixed with the pilot fluid, the operation of the second damping valve 20B is stabilized. As described above, even if the gas chamber, into which the gas G is to be sealed, is not divided by the free piston, it is possible to prevent the gas G from being mixed into the pilot fluid by guiding out the pilot pressure from the vertically lower side with respect to the gas G.

When the working oil in the rod-side chamber 2 is to be used as the pilot pressure, the pilot pressure may be guided to the pilot chamber 27 of the second damping valve 20B through the second space 42 and the pilot passages provided in the head portion 52.

According to the embodiment mentioned above, the advantages described below are afforded.

The damping characteristic of the second damping valve 20B can be changed by using the working oil in the bottom-side chamber 1 as the pilot pressure, and the supply and shut off of the pilot pressure can be switched by the solenoid valve 30, and thus, the size of the second damping valve 20B is not increased. Thus, it is possible to improve the mountability of the second damping valve 20B that is capable of changing the damping force.

In the following, modifications of the above-mentioned embodiment will be described. The modifications described below also fall within the scope of the present invention. It may also be possible to combine the following modifications with the configurations in the above-described embodiment, and it may also be possible to combine the following modifications with each other.

Figure 3:
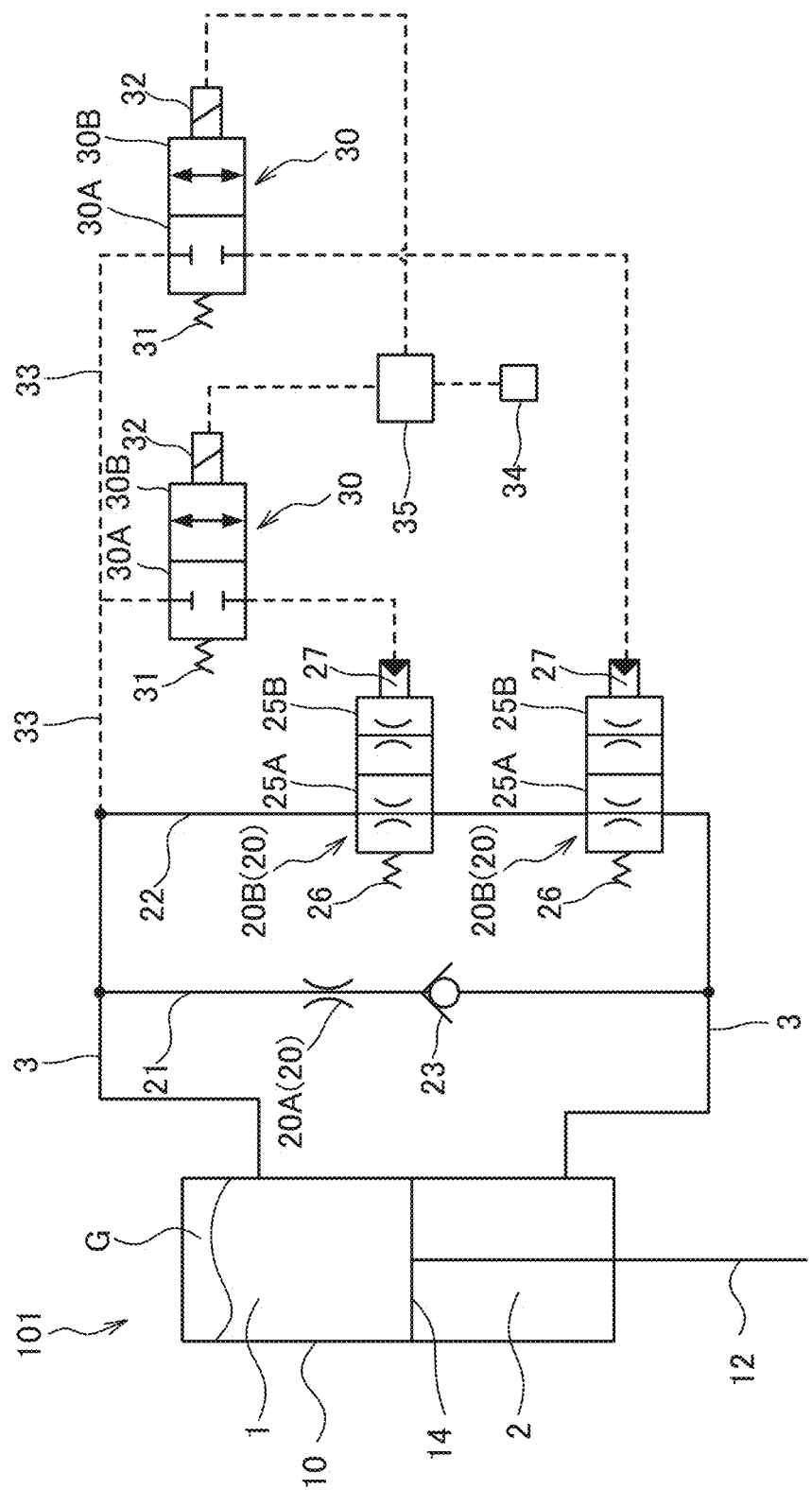
FIG. 3 is a fluid pressure circuit diagram of the fluid pressure shock absorber according to a modification of the embodiment of the present invention.

(1) In a hydraulic shock absorber 101 shown in FIG. 3, a plurality of second damping valves 20B are provided in the second flow path 22 in series, and a plurality of solenoid valves 30 are provided in parallel, and the plurality of solenoid valves 30 respectively switch the supply and shut off of the pilot pressure to the plurality of second damping valves 20B. The hydraulic shock absorber 100 according to the above-mentioned embodiment has two patterns of the damping characteristics. In contrast, the hydraulic shock absorber 101 according to this modification has four patterns of the damping characteristics. Therefore, it is possible to realize more optimal damping characteristic according to the load weight of the vehicle.

Figure 4:
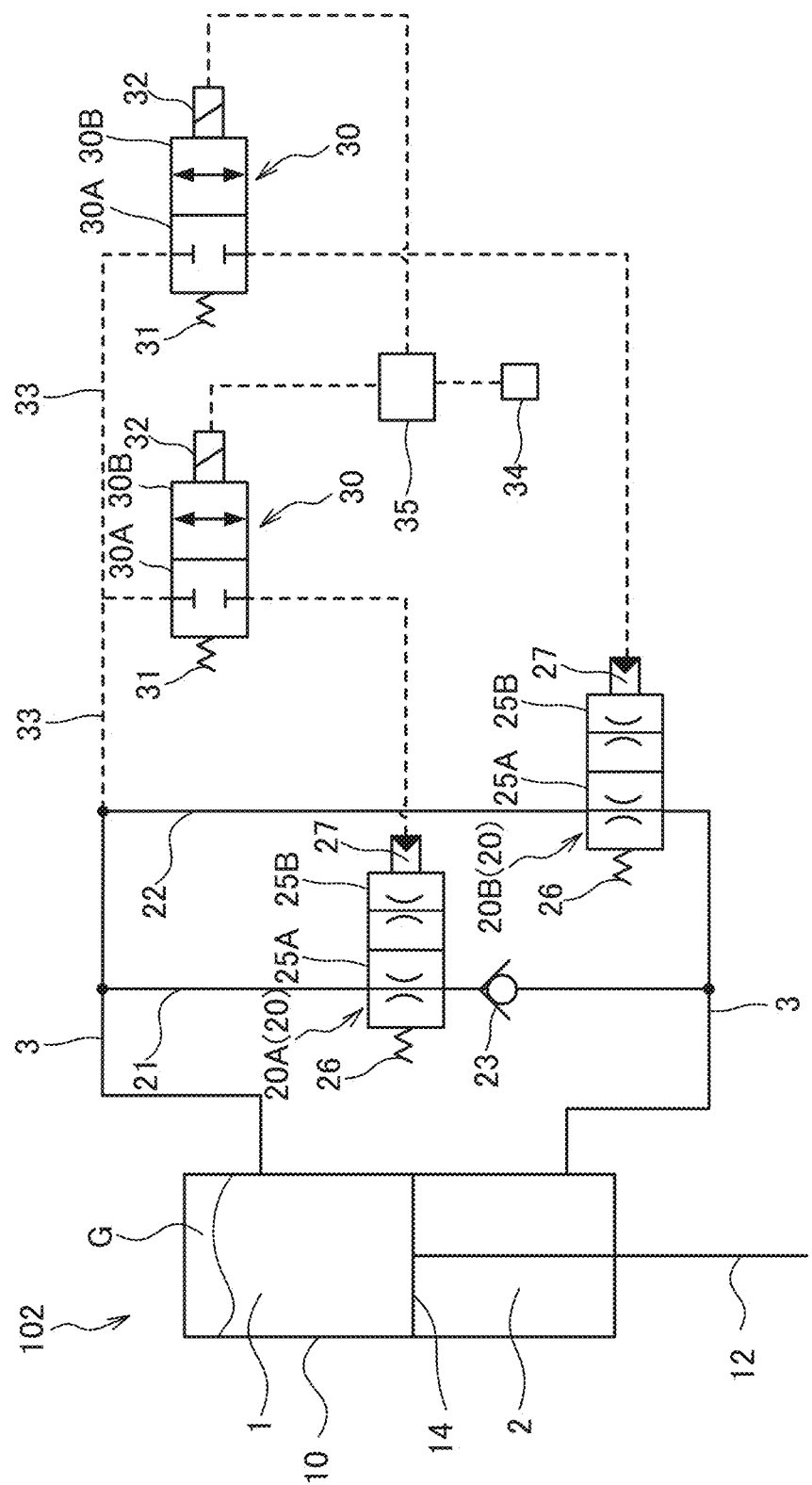
FIG. 4 is a fluid pressure circuit diagram of the fluid pressure shock absorber according to the modification of the embodiment of the present invention.

(2) In a hydraulic shock absorber 102 shown in FIG. 4, the damping characteristic can be changed in response to the pilot pressure also in the first damping valve 20A. In other words, the first damping valve 20A has the configuration that is the same as that of the second damping valve 20B of the hydraulic shock absorber 100 according to the above-mentioned embodiment. In addition, two solenoid valves 30 are provided in parallel, and these two solenoid valves 30 respectively switch the supply and shut off of the pilot pressure to the first damping valve 20A and the second damping valve 20B. Also in this modification, it is possible to realize more optimal damping characteristic according to the load weight of the vehicle.

In the hydraulic shock absorber 102, only a single solenoid valve 30 may be provided, and the first damping valve 20A and the second damping valve 20B may be operated by the pilot pressure guided through this single solenoid valve 30. In addition, the check valve 23 provided in the first flow path 21 may be provided in the reverse direction. In other words, the first damping valve 20A may be configured such that the resistance is imparted only to the flow of the working oil directed from the one of the bottom-side chamber 1 and the rod-side chamber 2 towards the other. Furthermore, the second flow path 22 in which the second damping valve 20B is provided may be provided with a check valve that only allows the flow of the working oil from the rod-side chamber 2 to the bottom-side chamber 1. In such a case, the second damping valve 20B imparts the resistance only to the flow of the working oil directed from the rod-side chamber 2 towards the bottom-side chamber 1.

Figure 5:
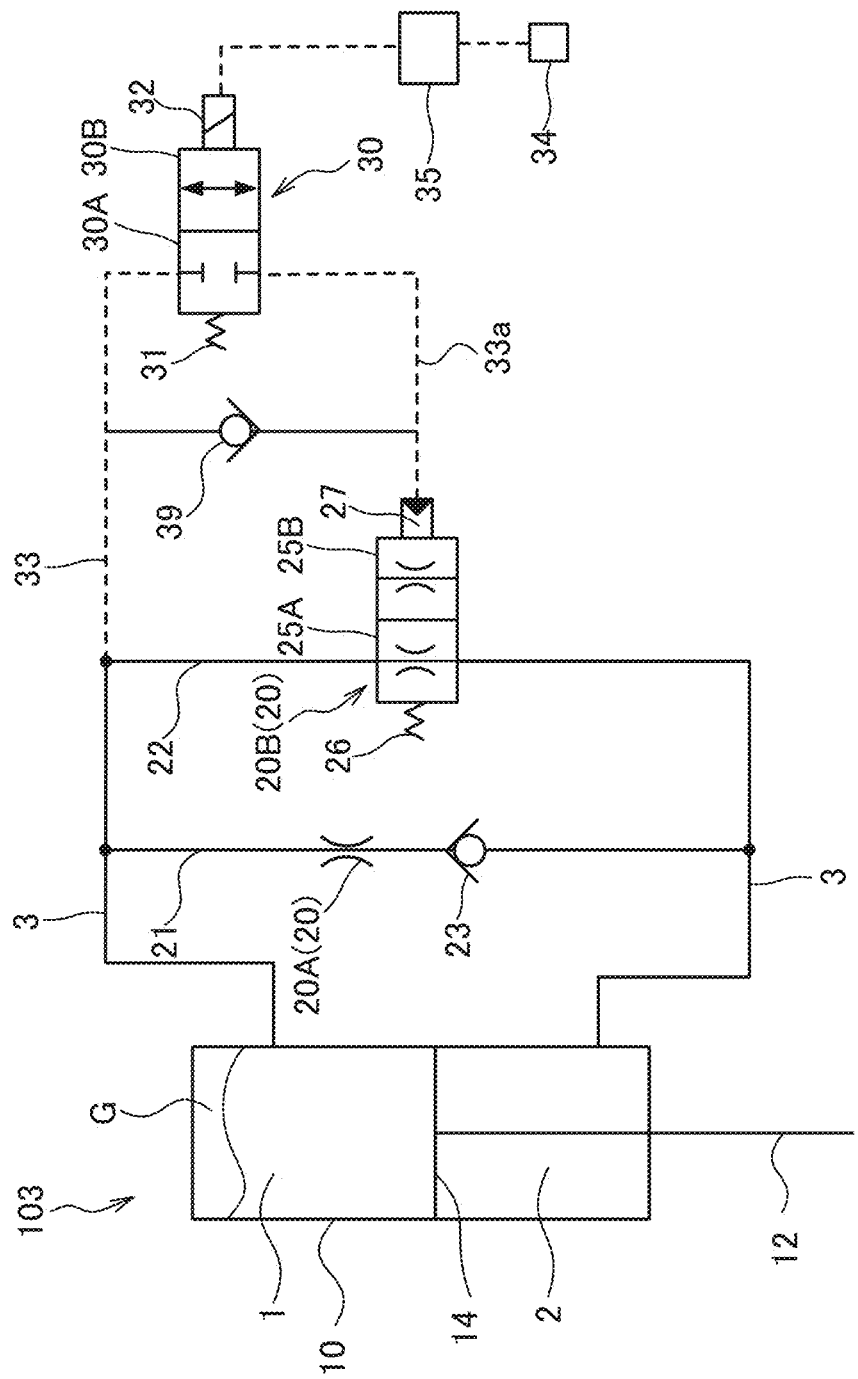
FIG. 5 is a fluid pressure circuit diagram of the fluid pressure shock absorber according to the modification of the embodiment of the present invention.

(3) A hydraulic shock absorber 103 shown in FIG. 5 includes a check valve 39 that only guides the pilot pressure from a downstream portion 33a of the pilot passage 33 on the downstream side of the pilot valve 30 between the solenoid valve 30 and the second damping valve 20B to the bottom-side chamber 1. By providing the check valve 39, when the solenoid valve 30 is switched from the supply position 30B to the shut-off position 30A, even if the pilot pressure remains in the downstream portion 33a of the pilot passage 33 on the downstream side of the pilot valve 30, the residual pressure is released to the bottom-side chamber 1 side through the check valve 39 when the hydraulic shock absorber 103 is extended, and so, the second damping valve 20B is switched to the first restricting position 25A smoothly. The check valve 39 may be provided so as to guide the pilot pressure only from the downstream portion 33a of the pilot passage 33 on the downstream side of the pilot valve 30 to the rod-side chamber 2. In this case, the residual pressure in the downstream portion 33a is released to the rod-side chamber 2 side through the check valve 39 when the hydraulic shock absorber 103 is contracted.

(4) In the above-mentioned embodiment, a description has been given of the configuration in which the hydraulic shock absorber 100 is mounted on the vehicle in the direction in which the cylinder tube 10 faces upward and the rod 12 faces downward. On the contrary, however, the hydraulic shock absorber 100 may be mounted on the vehicle in the direction in which the cylinder tube 10 faces downward and the rod 12 faces upward. In this case, in order to prevent upward movement of the gas G in the bottom-side chamber 1, it is required to provide, in the bottom-side chamber 1, a free piston that separates the liquid chamber in which the working oil is sealed and the gas chamber in which the gas is sealed. Alternatively, an accumulator connected to the bottom-side chamber 1 may be provided outside the cylinder tube 10, and a gas chamber may be provided in the accumulator.

(5) In the above-mentioned embodiment, although the hydraulic shock absorber 100 is of a single-rod type in which the tip end of the rod 12 projects out to the outside of the cylinder tube 10, the hydraulic shock absorber 100 may also be of a double rod type in which both ends of the rod 12 project out to the outside of the cylinder tube 10.

In the following, the configurations, operations, and effects of the respective embodiments of the present invention will be collectively described.

The hydraulic shock absorber 100, 101, 102, 103 (the fluid pressure shock absorber) mounted on the vehicle includes: the cylinder tube 10; the rod 12 inserted into the cylinder tube 10 so as to be movable back and forth; the piston 14 connected to the rod 12 and dividing the interior of the cylinder tube 10 into the bottom-side chamber 1 and the rod-side chamber 2; the damping valve 20 configured to impart the resistance to the flow of the working oil (the working fluid) between the bottom-side chamber 1 and the rod-side chamber 2, the damping valve 20 being capable of changing the damping characteristic in response to the pilot pressure; and the solenoid valve 30 configured to switch the supply and shut off of the pilot pressure to the damping valve 20, wherein the working fluid in the bottom-side chamber 1 or the rod-side chamber 2 is used as the pilot pressure.

With this configuration, the damping characteristic of the damping valve 20 can be changed by using the working oil in the bottom-side chamber 1 or the rod-side chamber 2 as the pilot pressure, and the supply and shut off of the pilot pressure can be switched by the solenoid valve 30, and thus, the size of the damping valve 20 is not increased. Thus, it is possible to improve the mountability of the damping valve 20 that is capable of changing the damping force.

In addition, the working oil in the bottom-side chamber 1 is used as the pilot pressure, and the pressurized gas G is sealed in the bottom-side chamber 1.

With this configuration, because the pressurized gas G is sealed in the bottom-side chamber 1, and the pressure in the bottom-side chamber 1 does not become negative pressure during the operation of the hydraulic shock absorber 100, it is possible to operate the damping valve 20 stably.

In addition, the plurality of the damping valves 20 are provided in series, the plurality of the solenoid valves 30 are provided in parallel, and the plurality of solenoid valves 30 are configured to respectively switch the supply and shut off of the pilot pressure to the plurality of the damping valves 20.

In addition, the hydraulic shock absorber 100 has, as the damping valve 20, the first damping valve 20A and the second damping valve 20B provided in parallel with each other, the first damping valve 20A and the second damping valve 20B being configured to impart the resistance to the flow of the working oil, and the first damping valve 20A imparts the resistance only to the flow of the working oil directed from the one of the bottom-side chamber 1 and the rod-side chamber 2 towards the other of the bottom-side chamber 1 and the rod-side chamber 2.

With these configurations, it is possible to realize an optimal damping characteristic according to the state of the vehicle.

In addition, the hydraulic shock absorber 100, 101, 102, 103 further includes: the pilot passage 33 provided with the solenoid valve 30, the pilot passage 33 being configuration to guide the working oil in the bottom-side chamber 1 or the rod-side chamber 2 to the damping valve 20 as the pilot pressure; and the check valve 39 configured to guide the pilot pressure from the downstream side of the solenoid valve 30 in the pilot passage 33 to the bottom-side chamber 1 or the rod-side chamber 2.

With this configuration, because the residual pressure in the pilot passage 33 caused when the solenoid valve 30 shuts off the supply of the pilot pressure is released through the check valve 39, it is possible to switch the damping valve 20 smoothly.

In addition, the rod 12 has: the rod main body 51 connected to the piston 14, the rod main body 51 being slidably supported by the cylinder tube 10; the head portion 52 exposed to the outside of the cylinder tube 10; and the rod inner space 40 formed inside the rod main body 51, the rod inner space 40 has: the first space 41 communicating with the bottom-side chamber 1; and the second space 42 communicating with the rod-side chamber 2, the damping valve 20 and the solenoid valve 30 are provided in the head portion 52, and the pilot pressure is guided through the first space 41 or the second space 42.

With this configuration, it is possible to prevent the gas from being mixed with the pilot fluid.

Embodiments of this invention were described above, but the above embodiments are merely examples of applications of this invention, and the technical scope of this invention is not limited to the specific constitutions of the above embodiments.

This application claims priority based on Japanese Patent Application No. 2022-35293 filed with the Japan Patent Office on Mar. 8, 2022, the entire contents of which are incorporated into this specification.

The invention claimed is:

1. A fluid pressure shock absorber mounted on a vehicle, comprising:
   a cylinder tube;
   a rod inserted into the cylinder tube so as to be movable back and forth;
   a piston connected to the rod and dividing an interior of the cylinder tube into a bottom-side chamber and a rod-side chamber;
   a damping valve configured to impart resistance to a flow of working fluid between the bottom-side chamber and the rod-side chamber, the damping valve being capable of changing damping characteristic in response to a pilot pressure; and
   a solenoid valve configured to switch supply and shut off of a pilot pressure to the damping valve, wherein
   the working fluid in the bottom-side chamber or the rod-side chamber is used as the pilot pressure.

2. The fluid pressure shock absorber according to claim 1, wherein
   the working fluid in the bottom-side chamber is used as the pilot pressure, and
   pressurized gas is sealed in the bottom-side chamber.

3. The fluid pressure shock absorber according to claim 1, wherein
   a plurality of the damping valves are provided in series,
   a plurality of the solenoid valves are provided in parallel, and
   the plurality of the solenoid valves are configured to respectively switch the supply and shut off of the pilot pressure to the plurality of the damping valves.

4. The fluid pressure shock absorber according to claim 1, wherein
   the damping valve has a first damping valve and a second damping valve provided in parallel with each other, the first damping valve and the second damping valve being configured to impart resistance to the flow of the working fluid, and
   the first damping valve imparts the resistance only to the flow of the working fluid directed from one of the bottom-side chamber and the rod-side chamber towards other of the bottom-side chamber and the rod-side chamber.

5. The fluid pressure shock absorber according to claim 1, further comprising:
   a pilot passage provided with the solenoid valve, the pilot passage being configured to guide the working fluid in the bottom-side chamber or the rod-side chamber to the damping valve as the pilot pressure; and a check valve configured to guide the pilot pressure from a downstream side of the solenoid valve in the pilot passage to the bottom-side chamber or the rod-side chamber.

6. The fluid pressure shock absorber according to claim 1, wherein the rod has:
a rod main body connected to the piston, the rod main body being slidably supported by the cylinder tube;
a head portion exposed to outside of the cylinder tube; and
a rod inner space formed inside the rod main body,
the rod inner space has a first space communicating with the bottom-side chamber and a second space communicating with the rod-side chamber,
the damping valve and the solenoid valve are provided in the head portion, and
the pilot pressure is supplied through the first space or the second space.

7. The fluid pressure shock absorber according to claim 1, wherein
the damping valve is configured to impart the resistance to the flow of the working fluid between the bottom-side chamber and the rod-side chamber in both directions.

8. The fluid pressure shock absorber according to claim 1, wherein
the damping valve is configured such that a position is switched in response to the pilot pressure, and the resistance imparted to the flow of the working fluid passing through the damping valve varies at each position.

* * * * *